United States Patent [19]

Harbin et al.

[11] 4,011,903
[45] Mar. 15, 1977

[54] DAMPER FOR HEATING/COOLING SYSTEM

[75] Inventors: Frank Harbin; Harry W. Slater, both of Holland, Mich.

[73] Assignee: Lear Siegler, Inc., Holland, Mich.

[22] Filed: Mar. 24, 1975

[21] Appl. No.: 561,412

[52] U.S. Cl. .................................. 165/27; 137/554; 165/48; 165/101; 165/137
[51] Int. Cl.² .......................................... F24F 3/02
[58] Field of Search ............... 165/137, 27, 24, 48, 165/101; 137/554, 556; 200/47; 236/1 C

[56] References Cited

UNITED STATES PATENTS

| | | | |
|---|---|---|---|
| 2,776,118 | 1/1957 | Davis | 165/24 |
| 2,800,306 | 7/1957 | Freeman | 165/27 |
| 3,202,978 | 8/1965 | Lewis | 137/554 X |
| 3,653,431 | 4/1972 | Loveley | 165/137 X |
| 3,769,947 | 11/1973 | Crain | 165/137 X |
| 3,794,014 | 2/1974 | McVickar et al. | 126/110 R |
| 3,908,751 | 9/1975 | Sheppard | 165/137 X |
| 3,910,345 | 10/1975 | Whalen | 165/27 X |

Primary Examiner—Carlton R. Croyle
Assistant Examiner—Edward Look
Attorney, Agent, or Firm—Price, Heneveld, Huizenga & Cooper

[57] ABSTRACT

A sliding damper plate is positioned between the blower and heat exchanger of a down draft gun-type furnace for mobile home usage and includes cam means at opposite ends thereof for actuating associated switches coupled to the furnace and air conditioning control circuits. When the damper is closed to cut off the flow path through the furnace to permit a separate air conditioner unit to utilize the existing heating ductwork in a mobile home, one of the switches is actuated to permit operation of the air conditioning unit. Alternatively, when the damper is moved to an open position for heating operation, the air conditioning unit is inactivated and a second switch closed by the cam to permit furnace operation. If the damper is partially open or closed, both the furnace and air conditioning unit are deactivated.

3 Claims, 4 Drawing Figures

DAMPER FOR HEATING/COOLING SYSTEM

BACKGROUND OF THE INVENTION

The present invention relates to heating/cooling systems for mobile homes and particularly, to a damper and control therefor facilitating use of existing ductwork for heating and cooling when a separate furnace and air conditioner units are employed.

In house central air conditioning installations, typically the furnace for the home is located in the basement with a large plenum chamber positioned above the heat exchanger of the furnace. Sufficient room exists in the plenum chamber for mounting of the evaporator coil such that the furnace blower can be employed in summer months for forcing air through the existing ductwork for central air conditioning of the home.

In mobile home construction, however, due to relatively stringent space restrictions, the compact gun-type furnaces do not easily permit the mounting of an air conditioner evaporator therein to permit use of existing ductwork for central air conditioning. In such case, central air conditioning is achieved by employing an air conditioning unit having its own blower and coupling the unit to the existing ductwork in a suitable manner. When doing so, it is desirable to seal off the furnace so that the cooled and conditioned air is not wastefully permitted to flow through the furnace during the cooling season.

SUMMARY OF THE INVENTION

To permit such use of existing ductwork, the present invention provides a movable damper plate positioned in the heating air flow path near the furnace. The movable damper can be opened and closed and includes means cooperating with the damper for providing signals to the furnace control system for preventing inadvertent operation of the furnace when the damper is in a closed or partially closed position or operation of the air conditioning unit when the damper is open or partially open.

It is an object, therefore, of the present invention to provide a system permitting ductwork in a mobile home to be utilized for central air conditioning.

Another object of the present invention is to provide a damper and control therefor to close the flow path through a furnace when ductwork therefor is employed for central air conditioning and to prevent inadvertent actuation of the furnace when the heating air flow path is restricted.

These and other objects of the present invention will become apparent upon reading the following description thereof together with the accompanying drawings in which:

DETAILED DESCRIPTION OF THE PREFERRED EMBODIMENT

Figure 1:
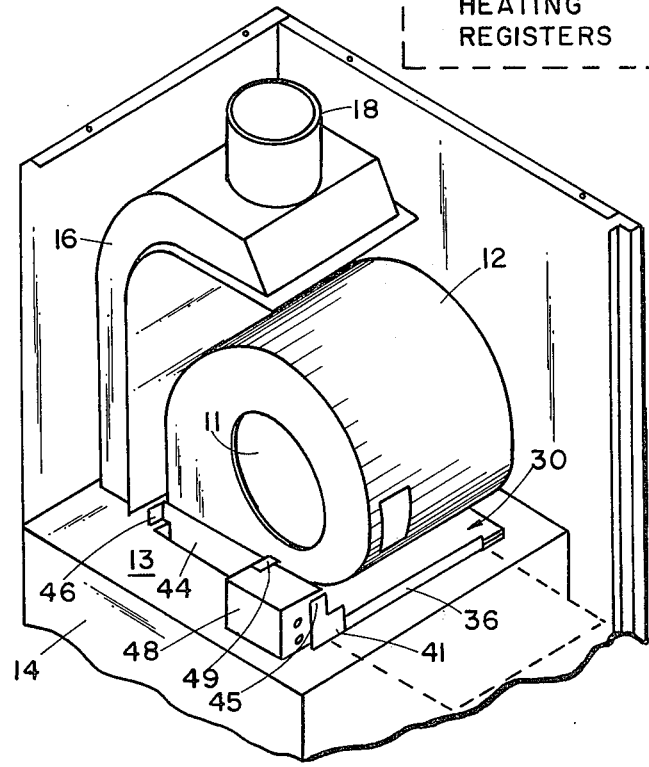
FIG. 1 is a fragmentary perspective view of a gun-type furnace showing the damper of the present invention installed thereon.

Referring now to the figures, FIG. 1 shows a portion of a gun furnace 10 employed in a mobile home, which furnace construction is disclosed in greater detail in U.S. Pat. No. 3,794,014 issued Feb. 26, 1974 entitled HOT-AIR FURNACE to Dan B. McVickar and Adolf Wolf and assigned to the present assignee. In such furnaces, a blower 12 is mounted to the top plate 13 of a heat exchange chamber 14 and forces air downwardly through an opening therein into the ductwork for distributing the heated air. A flue pipe 16 with an exhaust stack 18 removes the fumes from the combustion chamber within the heat exchanger 14.

Figure 2:
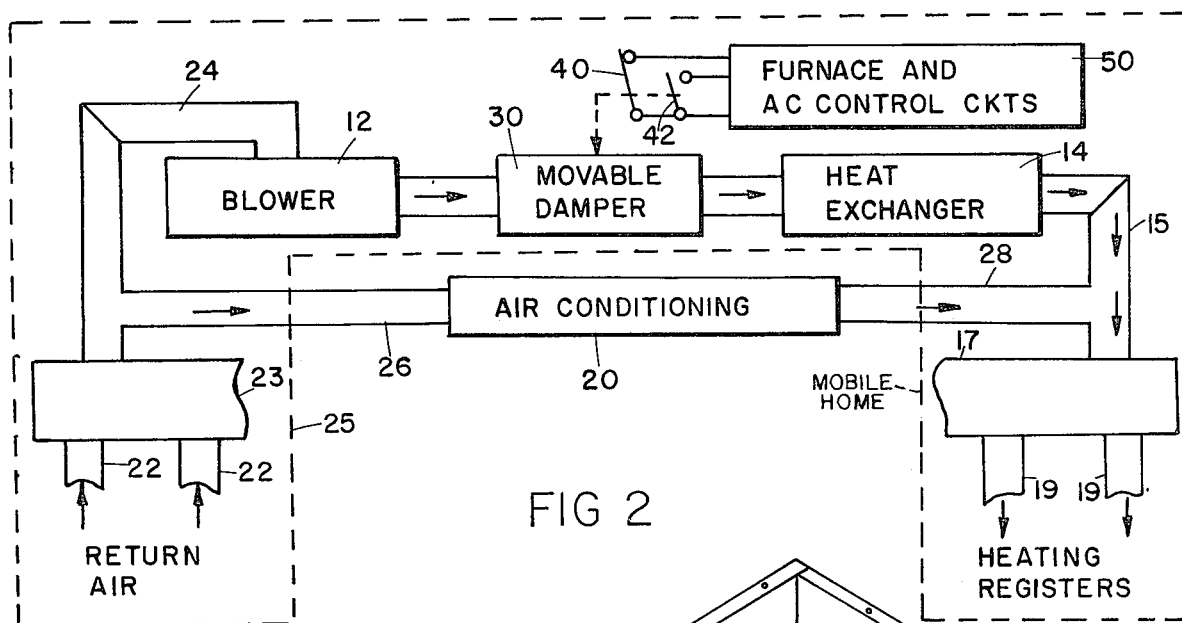
FIG. 2 is a block diagram of the heating/cooling system embodying the present invention.

In conventional furnaces of this construction, the flow path is always open permitting return air entering into inlet 11 of the blower 12 through suitable ductwork to be heated and circulated throughout the mobile home. Referring now to FIG. 2, there is shown a flow diagram of an installation including the present invention.

To facilitate utilization of a central air conditioning unit 20 including its own blower and which is typically mounted on the exterior of the mobile home 25 (shown schematically as dotted lines in the figure), a movable damper assembly 30 is positioned between the blower 12 and heat exchanger 14 of the gun furnace employed in the mobile home. The air circulation system includes one or more return air vents 22 leading to a return air duct 23 which supplies return air through duct 24 to the blower 12 and intake air through duct 26 to the air conditioning unit 20. The air conditioning unit is a commercially available system which includes a compressor and evaporator wherein the inlet air is circulated through the evaporator and cooled and dehumidified thereby and is forced out through the outlet duct 28 of the conditioner by its integral blower.

The hot air duct 15 of heat exchanger 14 communicates with outlet 28 of the air conditioner, both of which communicate with a heating and conditioned air duct network 17 including a plurality of registers 19 positioned in, for example, each of the rooms of the mobile home. Mechanically associated with the movable damper 30 to be selectively actuated thereby is a pair of switches 40 and 42 electrically coupled to the electrical control circuit 50 for controlling the operation of the furnace and air conditioner units. These normally open switches operate as safety interlocks preventing actuation of the furnace in the event the flow path between the blower and heat exchanger is closed or partly closed by the damper and actuation of the air conditioner when the system is in the heating mode of operation. Circuit 50 can be of the type described in detail in U.S. Pat. No. 3,872,320 of Joseph A. Juskewicz, Jr. and assigned to the present assignee. The switches 40 and 42 can be serially coupled at any number of suitable circuit locations to provide the interlock function as is apparent to those skilled in the art. Having briefly described the overall system, a detailed description of the novel movable damper and control follows with reference to FIGS. 1, 3 and 4.

The rectangular aperture through plate 13 aligns with the outlet end of blower 12 permitting the air discharged from blower 12 to be forced downwardly through the heat exchanger of the furnace. The damper assembly 30 is, in the preferred embodiment, however, positioned between the discharge end of blower 12 and this aperture to open or close the flow path of air through the heat exchanger.

Figure 3:
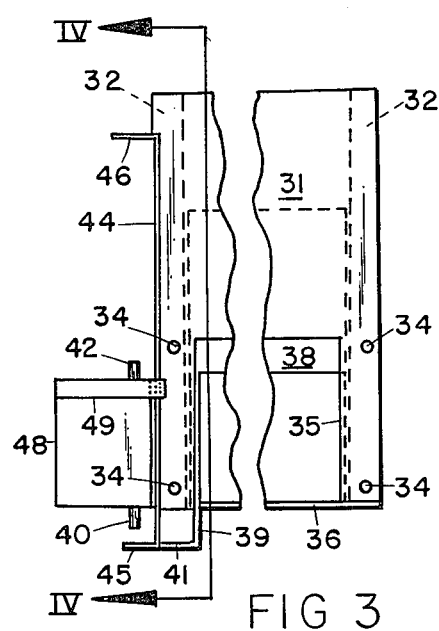
FIG. 3 is a fragmentary enlarged plan view of the damper structure.
Figure 4:
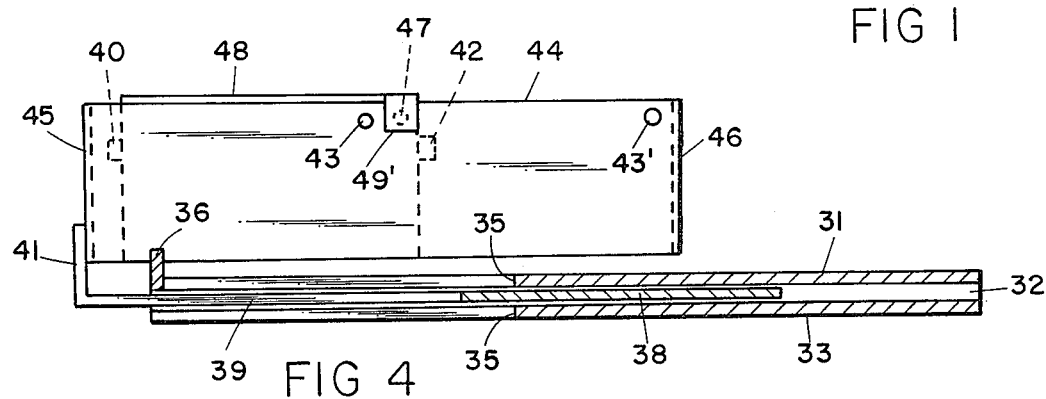
FIG. 4 is an enlarged cross-sectional view of the damper assembly taken along section lines IV—IV of FIG. 3.

The movable damper assembly 30 comprises an upper plate 31 and a lower plate 33 joined together in vertically, spaced relationship by means of elongated spacer plates 32 extending along the opposite elongated edges of the upper and lower plates and welded therebetween as best seen in FIGS. 3 and 4. Extending through the sandwich structure so formed are a plurality of apertures 34 for bolting the upper and lower plate structure to the top plate 13 of the heat exchanger 14. Rectangular apertures 35 extending through each of the upper and lower plates are aligned with each other and with the corresponding aperture in floor 13 between blower 12 and the heat exchanger 14.

The upper and lower plates and the spacer strips are of approximately 15 gauge steel sheet. Upper plate 31 includes a reinforcement lip extending upwardly along the front edge thereof.

In the space provided between the upper and lower plates there is movably positioned an 18 gauge sliding plate 38 including a tongue 39 extending forwardly from the left edge as best seen in FIGS. 3 and 4. Integrally formed and extending upwardly from the free end of tongue 39 is a flange 36 defining a handle pull for the sliding plate. The sliding plate is thus movably positioned between the spaced upper and lower plates and guided by the spacer strips 32 along its opposite edges.

Welded to the left edge of handle 36 is a vertically extending cam plate 44 having outwardly directed flanges 45 and 46 at its front and rear ends respectively. Flanges 45 and 46 engage and actuate switches 40 and 42, respectively, which are mounted to a housing 48 in turn mounted to a platform (not shown) extending from the lower plate 33. Thus, the housing 48 is stationary with respect to the sliding plate 38. An L-shaped guide bracket 49 extends over the top of housing 46 and includes a downwardly directed flange 49' spaced from the inner surface of housing 48 such that cam plate 44 is guidably supported, as seen in FIGS. 3 and 4, with respect to the stationary housing. A commercially available bullet-type catch 47 (FIG. 4) is mounted to housing 48 behind lip 49'. Catch 47 includes a spring-loaded movable element to alternately engage a front aperture 43 in plate 38 for holding the plate in a retracted position or a rear aperture 43' for holding the plate in an extended position.

In operation, as seen in FIG. 1, the sliding plate 38 is in its inward position such that the plate is rearward to open apertures 35 permitting furnace operation with the flow path from blower 12 into heat exchanger 14. In this position, switch 40 is actuated by flange 45 to close the switch and permit operation of the furnace and the plate is held by catch 47 in aperture 43. As seen in FIG. 3, as the sliding plate is pulled outwardly even partially, switch 40 will no longer engage flange 45 and thereby open deactuating the furnace. When the sliding plate is drawn outwardly to its fullest extent by handle 36 (as seen in phantom lines in FIG. 1) and held by catch 47, switch 42 is closed by flange 46 on cam plate 44. In this position, the furnace control is deactuated by the opening of switch 40 while the air conditioning control is permitted to operate by the closure of switch 42. Thus, the combined movable damper together with the cam means and control switches associated therewith permit either furnace operation or air conditioning operation when the movable plate is in its fully open or fully closed position but deactivates both in the event that the sliding plate is improperly positioned in a partially open or closed location.

It will become apparent to those skilled in the art that various modifications to the preferred embodiment shown and described herein can be made without departing from the spirit or scope of the present invention as defined by the appended claims.

The embodiments of the invention in which an exclusive property or privilege is claimed are defined as follows.

1. A damper and control for permitting use of common ducts in a heating/cooling system in which separate air forcing means are provided for a furnace associated therewith and an air conditioning unit associated therewith, said damper and control comprising:
  a stationary plate mounted to the furnace in the air flow path and including a relatively large aperture extending through said plate;
  a sliding plate movable between a first position which restricts the aperture of said stationary plate and a second position wherein said aperture is unrestricted;
  camming means comprising an elongated cam plate with a pair of spaced flanges extending outwardly therefrom, said cam plate coupled to said sliding plate approximately parallel to the direction of motion of said sliding plate; and
  electrical switch means comprising first and second electrical switches positioned to be alternately actuated by one of said flanges of said cam plate for providing a signal usable by a furnace control circuit to deactivate the furnace when said apertures are restricted by said sliding plate.

2. A damper and control for permitting use of common ducts in a heating/cooling system in which separate air forcing means are provided for a furnace associated therewith and an air conditioning unit associated therewith, said damper and control comprising:
  a pair of spaced, stationary plates mounted to each other and including relatively large aligned apertures extending through both plates;
  a sliding plate movable between a first position which restricts the apertures of said stationary plates and a second position wherein said apertures are unrestricted;
  camming means comprising an elongated cam plate with a pair of spaced flanges extending outwardly therefrom, said cam plate coupled to said sliding plate approximately parallel to the direction of motion of said sliding plate; and
  electrical switch means comprising first and second electrical switches positioned to be alternately actuated by one of said flanges of said cam plate for providing a signal usable by a furnace control circuit to deactivate the furnace when said apertures are restricted by said sliding plate.

3. The system as defined in claim 2 and further including a housing positioned adjacent said cam plate and wherein said switches are mounted in said housing, said housing further including guide means extending therefrom to engage an edge of said cam plate for guidably supporting said cam plate as it is moved.

* * * * *